Nov. 26, 1957 J. A. TOURTELLOT 2,814,770
ELECTRIC MOTOR
Filed July 30, 1956 2 Sheets-Sheet 1

INVENTOR.
John A. Tourtellot
BY
ATTORNEY.

Nov. 26, 1957 J. A. TOURTELLOT 2,814,770
ELECTRIC MOTOR
Filed July 30, 1956 2 Sheets-Sheet 2
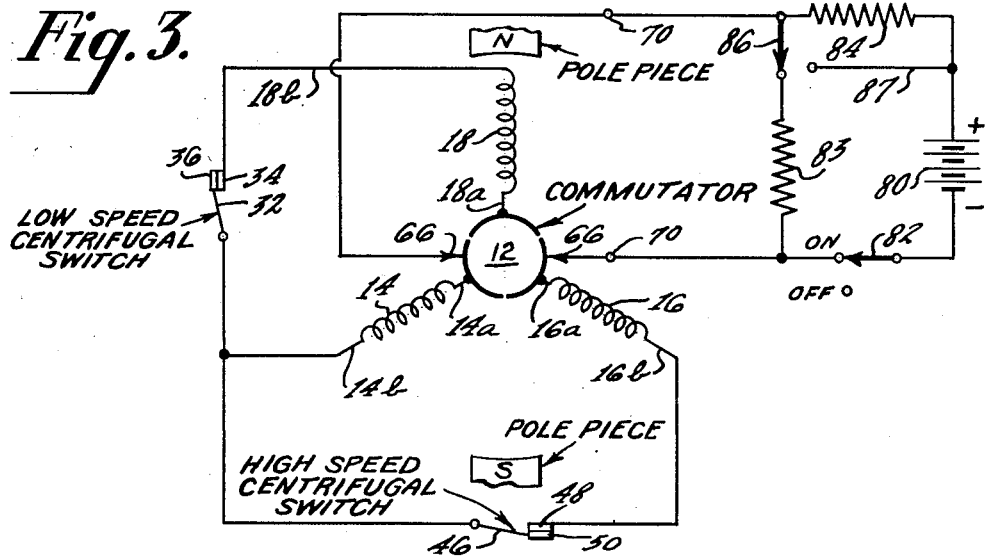
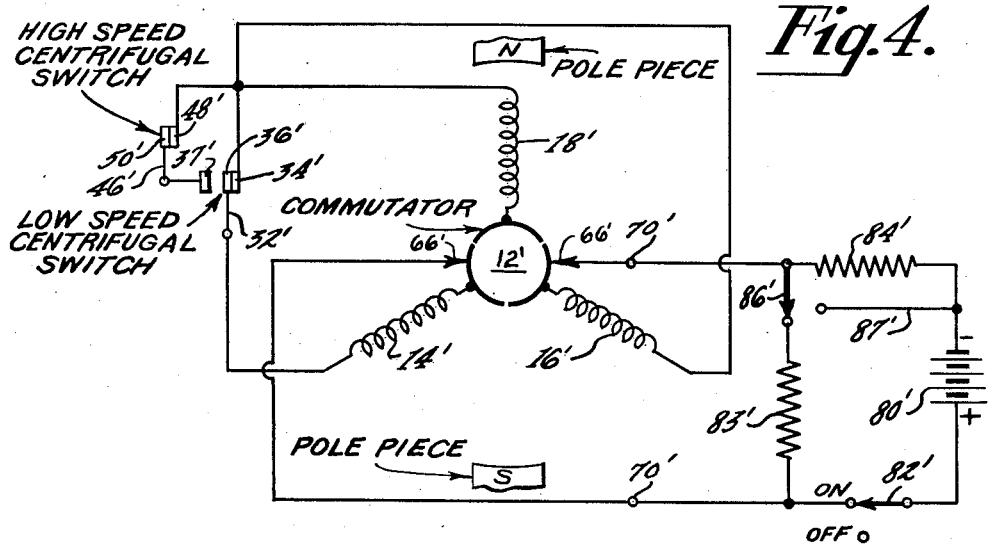
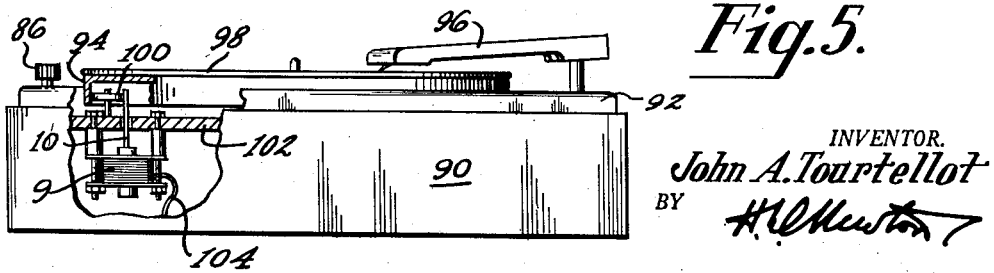
INVENTOR.
John A. Tourtellot
BY
ATTORNEY.

United States Patent Office 2,814,770
Patented Nov. 26, 1957

2,814,770
ELECTRIC MOTOR

John A. Tourtellot, Merchantville, N. J., assignor to Radio Corporation of America, a corporation of Delaware Application July 30, 1956, Serial No. 600,963

7 Claims. (Cl. 318—325)

This invention relates generally to electric motors, and more particularly relates to plural speed direct-current motors for driving the turntables of plural-speed phonograph record players and the like.

It is an object of this invention to provide an improved low cost electric motor the speed of which is accurately controlled at any one of a plurality of predetermined speeds of rotation.

Another object of this invention is to provide an improved electric phonograph record player of the type including a rotatable turntable which includes a direct-current turntable driving motor which is operable to drive the turntable at either of two accurately regulated speeds without using mechanical speed changing apparatus.

It is a further object of this invention to provide an improved two-speed direct-current drive motor in which the speed of rotation may be accurately regulated at either of two speeds of rotation in a simplified and convenient manner, without requiring a precise setting of the voltage applied to the motor.

In accordance with the invention, two or more centrifugally operated electric switch means are mounted on the armature of a direct current motor, and are connected in circuit with the motor armature windings. Each of the switch means is primarily effective to control the speed of rotation of the armature at a different speed of rotation by making and breaking the current return circuit of the armature windings with which it is connected. The particular speed of operation of the motor is selected by adjusting the magnitude of the direct voltage applied to the armature windings. The actual voltage applied is not critical, and the motor speed is maintained constant over a relatively wide range of variation in the applied voltage, and therefore the motor speed may be conveniently controlled by merely switching different values of resistance in circuit with armature windings.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 3 is a schematic circuit diagram showing the connection of the armature windings and control circuit connections of the plural speed motor shown in Figures 1 and 2;

Figure 4 is a schematic circuit diagram showing a modification of the connections of the armature windings and control circuit connections of Figure 3 in accordance with the invention; and Figure 5 is a front elevational view parly broken away, of a two speed record player incorporating the electrical motor of the invention.

Figure 1:
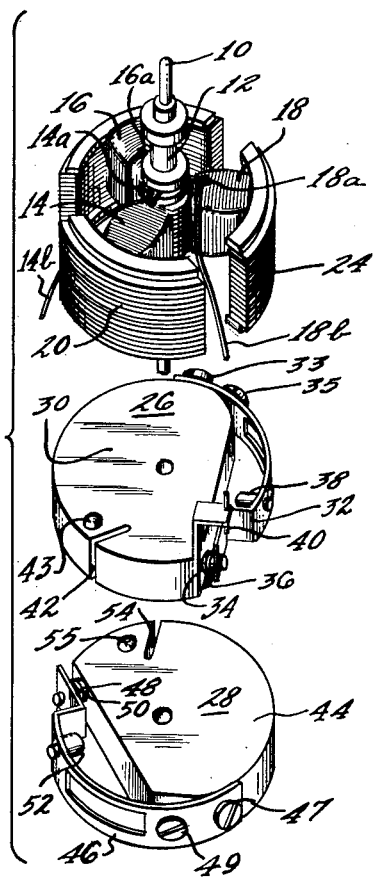
Figure 1 is an exploded perspective view of the armature and centrifugally operated switch means of an electric motor constructed in accordance with the invention.
Figure 2:
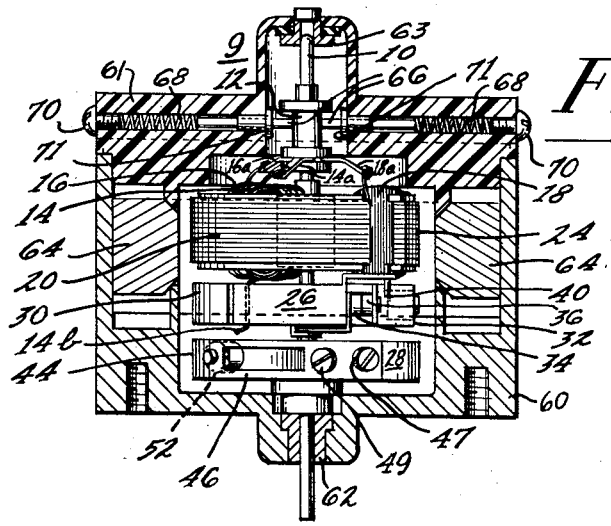
Figure 2 is a sectional side view of the entire electric motor of the invention including those portions shown in Figure 1.

Referring now to the drawings wherein like reference numerals are used to designate similar components in the various figures, and particularly to Figures 1 and 2, the electric motor 9 (Fig. 2) of the invention includes an armature shaft 10 which supports four major assemblies; the commutator assembly 12; the armature windings 14, 16 and 18 and armature core pieces 20, 22 and 24; the low speed governor 26; the high speed governor 28.

The armature core pieces 20, 22 and 24 each comprise a series of generally T-shaped laminations which are joined at the armature shaft 10 and clamped tightly together. The outer portion of the armature cores are curved on a common radius so that the three separate cores provide an outer surface which is essentially cylindrical in configuration. The armature windings 14, 16 and 18 are wound on the legs of the T-shaped armature cores 20, 22 and 24 respectively. Each of the armature windings has a terminal connection lead 14a, 16a, and 18a which are individually connected to one of three segments of the commutator assembly 12. Second terminal connection leads 14b, 16b, and 18b for each of the armature windings are brought out to the low speed and high speed governors 26 and 28.

The low and high speed governors comprise essentially centrifugally operated switches which operate to make and break the electrical circuit to one or more of the armature windings in accordance with the speed of rotation of the armature. The low speed governor 26 includes an insulating supporting member 30 having a central aperture for receiving the shaft 10. A switch arm 32 is fastened at one end thereof by two screws 33 and 35 to the supporting member 30. A first contact member 34 is mounted on the member 30 for cooperation and engagement with a second contact member 36 supported on the free end of the switch arm 32. The switch arm which is made of a resilient spring metal material is biased to maintain contact normally between the contact members 34 and 36. The switch arm 32 also carries a small weight 38 near the free end thereof. The screw 35 provides a tension adjustment for the switch arm 32 to adjust the spring force, and thereby determine the speed at which centrifugal force causes the switch arm to move outwardly and the contact members 34 and 36 to break contact. To prevent the switch arm 32 from moving too far outwardly at higher speeds of operation, a stop pin 40 which is held by the supporting member 30, projects over and above the switch arm 32.

A slot 42 is provided in one edge of the supporting member 30 as a convenient guide for a terminal connection lead 14b which extends from the armature winding beneath the supporting member 30 to the fastening screw 33 for the switch arm 32. The contact member 34 is connected by way of the terminal connection lead 18b to the armature winding 18. In order to balance the governor 26 on the armature shaft 10, a weight comprising a steel ball bearing 43 is suitably inserted into an aperture formed in one side of the supporting member 30.

The high speed governor 28 also includes an insulating supporting member 44 mounted on the shaft 10. A switch arm 46 is fastened at one end thereof by the screws 47 and 49 to the supporting member 44. A first contact member 48 is mounted on the member 44 for cooperation and engagement with a second contact member 50 supported at the free end of the switch arm 44. The switch arm 44 is made of a resilient spring metal material which is biased in a direction to maintain contact normally between the contact members 48 and 50. The switch arm also carries a weight 52 near the free end thereof. The screw 49 provides a tension adjustment for the switch arm 46 to determine at what higher speed of rotation the centrifugal force will cause the switch arm 46 to move outwardly causing the contact members 48 and 50 to break contact.

A slot 54 is provided in one edge of the supporting member 44 as a guide for the terminal connection lead 16b, not shown in Figures 1 and 2, which extends from the armature winding 16 to the contact member 48. The switch arm 46 is connected by a conductor, not shown, to switch arm 32 on the low speed governor which in turn is connected by way of the terminal connection lead 14b to the armature winding 14. A weight comprising a steel ball bearing 55 or the like is suitably inserted into an aperture formed in one side of the supporting member 44 to balance the high speed governor 28 on the armature shaft 10.

The armature shaft 10 and component assemblies mounted thereon are supported for rotation in the motor stator element within a main housing 60 and associated end bell 61 of insulating material. A portion of the armature shaft 10 extends externally through a bearing 62 in the main housing 60, and provides the motor drive shaft. The other end of the armature shaft 10 rotates in a bearing 63 mounted in the end bell 61. A pair of Alnico permanent magnets 64 in the stator element are positioned on opposite sides of the main housing 60, and are interlinked by a pair of suitable soft iron pole pieces (not shown). The pole pieces are curved to follow the contour of the cylindrical armature core, and are closely spaced with respect to the armature core to provide only a very small air gap.

The insulating end bell 61 includes a pair of radially extending bores which are aligned with the commutator assembly 12. Brushes 66 are inserted into each of the bores and are biased by the springs 68 to bear against the commutator assembly segments. A pair of screws 70 serve to retain the springs 68 in the bores, and also provide electric terminal connections to the motor since a conductive connection is provided from the screws to the commutator through the springs 68 and the brushes 66.

The operation of the two speed motor of the invention will now be described in greater detail with reference to the schematic diagram of Figure 3. A control circuit including a battery 80 which provides the direct current operating supply for the motor is connected to the motor input terminals 70 and an on-off switch 82. The control circuit includes a pair of resistors 83 and 84 and a speed selector switch 86. The resistors 83 and 84 are connected to form a voltage divider when the speed selector switch 86 is in the position shown in Figure 3, and these resistors are proportioned so that the voltage across the resistor 83, across which the motor is connected, is the proper voltage for operation of the motor at the lower of the two speeds for which it was designed. In the alternate position of the switch 86 the resistor 84 is shorted out through the conductor 87, and the full battery voltage is applied to the motor terminals 70 for operation at the higher speed. This control circuit has the advantage of restricting the variation in the voltage applied to the motor for low speed operation, and also permits a higher starting current than can be obtained when only a series connected voltage dropping resistor is used for low speed operation.

As pointed out above, the armature winding 14 is connected to the switch arm 32 on the low speed governor 26 and also to the switch arm 46 on the high speed governor 28. The armature windings 18 and 16 are connected respectively to the relatively fixed contact members 34 and 48 respectively on the low and high speed governors.

For low speed operation the speed selector switch is connected to the resistor 83 so that a portion of the battery voltage is developed across the resistor 84 and a voltage somewhat lower than the battery voltage is applied to the motor. At the lower speed of rotation the centrifugal force is not sufficient to cause the high speed switch arm 46 to move out and break the circuit between the armature windings 14 and 16 through the switch arm 46.

After the motor comes up to speed, a further increase in speed of rotation over the desired rate will cause the switch arm 32 on the low speed governor to move outwardly by centrifugal force, thereby moving the contact member 36 away from the contact member 34 and opening the current return path from the armature winding 18. With the contact members 34 and 36 open, no current flows in the armature winding 18, and therefore the torque ordinarily supplied by this winding is lost, causing the motor speed to drop. When the motor speed falls low enough, the switch arm 32 moves in closing the contact members 34 and 36 and reestablishing the armature winding 18 in the motor circuit. This action is repetitive to maintain the motor speed of rotation at the desired rate. Actually under certain operating conditions the contacts 34 and 36 may open and close as many as four or five times in a single revolution of the armature shaft 10.

For high speed operation, the speed selector switch 86 is connected to the conductor 87 to short out the resistor 84 and thereby apply the full battery voltage to the motor. The higher voltage applied to the motor causes the speed of rotation to increase thereby opening the contacts 34 and 36 so that the motor torque is developed by the action of the armature windings 14 and 16. The pin 40 prevents the switch arm 32 on the low speed switch from moving out too far and possibly causing damages to the switch or to other motor parts.

After the motor comes up to speed, a further increase in the speed of operation over the desired high rate will cause the switch arm 46 to move outwardly by centrifugal force thereby moving the contact member 50 away from the contact member 48, thus opening the current return path for the armature windings 14 and 16. With the contact between the contact members 48 and 50 broken, no current flows in the armature windings 14 and 16, and therefore the motor slows down. When the motor speed falls low enough, the switch arm 46 moves in closing the contact members 48 and 50, and thereby reestablishing the current return path for the armature windings 14 and 16. This action is repetitive and maintains the motor speed of rotation at the desired rate, and as mentioned above, the contacts 48 and 50 may open and close several times in one revolution of the armature shaft 10.

In a motor designed for operation at 1200 R. P. M. and 3250 R. P. M., it was found that the voltage applied to the motor was not critical and for the lower speed operation satisfactory performance was had when the applied voltage ranged from 3 to 5.5 volts. At higher speeds of rotation it was found that the motor gave good performance over a range from 10 to 23 volts.

Thus, it can be seen for operation with phonographs or the like a speed change may be effected merely by switching a resistor into and out of circuit in series with the direct current supply means for the motor.

Referring now to Figure 4, a modification of a plural speed electric motor constructed in accordance with the invention will be discussed. The motor physically is similar to that shown and described above in connection with Figures 1 to 3 with the exception of a slight modification in the low speed governor, and the circuit connections to the low speed and high speed governors. The low speed governor as described above is adapted to effect the making and breaking of contact between the contact members 34' and 36' when the armature speed exceeds the desired lower rate. However, for high speed operation the switch arm 32' of the low speed governor is adapted to swing open and engage a relatively stationary contact member 37'. Physically the contact member 37' may be mounted in the same manner and in the same place as the stop member 40, as shown and described in connection with Figure 1.

For low speed operation the speed selector switch 86' is in the position shown so that the resistors 83' and 84' form a voltage divider which is proportioned to supply the proper operating voltage to the motor. As the motor comes up to speed, an increase in the rate of rotation of the desired amount causes the switch arm 32' to move the contact member 36' away from the contact member 34' thereby breaking the current return path for the armature winding 14'. The rate of making and breaking contact between the contact members 32' and 34' is several times per revolution of the armature as mentioned above. The centrifugal switch is designed so that the clearance between the contact member 36' and the contact member 37', is sufficiently great so that no contact therebetween is made at low speed operation and the speed of operation is accurately controlled in accordance with the design of the low speed governor.

For high speed operation, the speed selector switch 86' is connected to the conductor 84' thereby shorting out the resistor 84' and applying a higher voltage to the motor. The higher voltage applied to the motor causes the speed of rotation to increase, thereby causing the contacts 34 and 36 to remain opened. However, the contact member 36' engages the contact member 37' so that the current return path for the armature winding 14' is now completed through the low speed centrifugal switch arm 32' to the high speed governor including the contact members 48' and 50'.

At the desired higher speed of operation, the regulation of the armature speed is effected as described hereinabove, wherein the contact members 48' and 50' make and break the electric circuit which comprises the direct current return path for the armature winding 14'.

Although the invention has been described in connection with star or Y connected armature windings, the invention is equally applicable to other armature winding connections such as delta connected windings, for example.

Referring now to Figure 5, the two speed direct current motor of the invention is shown as a turntable driving motor for a phonograph record player. The record player includes a cabinet 90 in which a motor board 92 is resiliently mounted to avoid the transmission of vibration or shock to the elements mounted on the motor board. The record player is of the type for playing records which must be rotated at different speeds for reproduction such as 45 R. P. M., 33 R. P. M. and 16.6 R. P. M. records. To this end a turntable 94 is mounted for rotation on the motor board 92 and a tone arm 96 is pivotally supported on the motor board adjacent the turntable 94. A pickup element is supported on the free end of the tone arm and is adapted to engage and track a record 98 supported on the turntable 94.

The turntable has a dependent annular flange which is engaged by a driving roller or idler 100 mounted on the free end of the armature shaft 10 of the two speed motor 9 of the invention. The motor which is supported from a suitable mounting flange 102 is powered from a battery or other direct current source through a power cable 104 connected between the motor terminals and the control circuit as hereinbefore described. The phonograph apparatus is designed for portable or vehicular use and hence must be designed for use from the direct current source mentioned above.

The speed of the motor may be quickly and easily changed merely by operating the speed selector switch 86 which may be mounted on the upper surface of the motor board 92. The switch is connected in the motor control circuit, as described, to change the value of the voltage applied to the motor. This construction avoids the necessity of mechanical speed changing apparatus which not only adds to the cost of the phonograph record player, but requires additional space. By using the plural speed motor of the invention, a more economical and compact phonograph unit can be provided which is operable to drive the turntable at any desired regulated rate of rotation without critical adjustment of the direct voltage applied thereto.

In accordance with the invention a plural speed direct current motor is provided in which the speed of rotation may be accurately regulated at either two speeds of rotation in a simple and effective manner merely by adjusting the direct voltage applied to the motor. This may be conveniently accomplished by selectively shorting out for the higher speed a suitable resistor normally in series with the motor for the lower speed.

What is claimed is:

1. An electric motor comprising in combination a rotatable armature having a plurality of armature windings, commutator means connected with said armature windings for applying operating current thereto, a low speed centrifugally operated switch and a high speed centrifugally operated switch each actuated at different speeds of armature rotation mounted on said armature, and means connecting said low speed and said high speed centrifugally operated switches in circuit with at least one of said armature windings, said armature being regulated at a first lower speed of rotation upon application of a first operating voltage to said armature windings by the intermittent deenergization of at least one of said armature windings connected in circuit with said low speed switch, and said armature being regulated at a second higher speed of rotation upon application of a second higher operating voltage to said armature windings by the intermittent deenergization of at least one of said armature windings connected in circuit with said high speed switch.

2. A two speed electric motor comprising in combination, an armature, first, second and third armature windings supported on said armature, means providing a commutator having a plurality of segments each individually connected to a different one of said armature windings, a low speed centrifugal switch supported on said armature and connected in series between said first and second armature windings, said low speed centrifugal switch being operable in response to speeds of said armature above a predetermined rate of rotation to open the series connection between said first and second armature windings, and a high speed centrifugal switch connected in series between said third armature winding and another of said armature windings, said high speed switch being operable in response to speeds of said armature above a predetermined higher rate of rotation to open said last-named series connection.

3. An armature for a plural speed electric motor comprising in combination, an armature shaft; a plurality of armature windings each having first and second circuit connection terminals mounted on said shaft; commutator means on said shaft having a plurality of individual conductive segments for connection with the direct current power source, means connecting the first terminal of each of said armature windings with a different one of said commutator segments; a low speed governor comprising a first centrifugally operated switch and a support member for said switch mounted on said shaft, said switch including a resilient switch arm fastened to said support member at one end thereof and having a free end extending in substantially concentric relation to said shaft, a first contact member for said switch mounted on said support member, and a second contact member for said switch supported at the free end of said switch arm for cooperation and in normal conductive connection with said first contact member, said resilient switch arm being responsive to centrifugal force to break the connection between said first and second contact members at a first lower speed of rotation of said armature shaft; a high speed governor comprising a second centrifugally operated switch and a support member for said switch mounted on said shaft, said switch including a second resilient switch arm fastened to said last-named support member at one end thereof and having a free end extending in substantially concentric relation to said shaft, a third contact member mounted on said second support member, and a fourth contact member supported at the free end of said second switch arm for cooperation and normal conductive connection with said third contact member, said second resilient switch arm being responsive to centrifugal force to break the connection between said third and fourth contact members at a second higher speed of rotation of said shaft in operation; means connecting the second terminals of two of said armature windings to said first and second contact members, and means connecting the second terminal of two of said armature windings to said third and fourth contact members.

4. In a plural speed electric motor the combination comprising, a rotatable armature having a plurality of armature windings, each having a pair of terminals, commutator means for said armature having a plurality of conductive segments for connection with a direct current power supply, means connecting one terminal of each of said armature windings with a different segment of said commutator means, means providing a first centrifugally operated switch having a pair of normally closed contacts actuated to open at a first speed of rotation of said armature, said switch being connected in series with one of said armature windings and operable upon application of a first direct voltage to said commutator means to regulate said armature at said first speed of rotation by opening said series circuit and deenergizing said one winding above said first speed of rotation, a second centrifugally operated switch having a pair of normally closed contacts actuated to open at a second higher speed of rotation of said armature, said second switch being connected in series with another of said armature windings and being operable upon application to said commutator means of a second direct voltage of greater magnitude than said first direct voltage to regulate said armature at said second speed of rotation by opening said last-named series circuit and deenergizing said other winding in response to speeds above said second speed of rotation.

5. A two speed electric motor comprising in combination an armature shaft, a plurality of windings supported on said armature shaft, means on said armature shaft providing a commutator having a plurality of segments each individually connected to a different one of said armature windings, a low speed centrifugal switch mounted on said armature shaft and connected in circuit with said armature windings, said low speed switch operable in response to speeds of said armature above a predetermined lower rate of rotation to open and deenergize at least one of said armature windings thereby to reduce the speed of armature rotation, a high speed centrifugal switch mounted on said armature shaft and connected in circuit with said armature windings, said high speed switch being operable in response to speeds of said armature above a predetermined higher rate of rotation to open and deenergize at least one of said armature windings thereby to reduce the speed of armature rotation, direct voltage operating supply means connected with said commutator means, resistance means connected in series with said direct voltage operating supply means, and a speed selector switch connected in parallel with said resistance means and having an open position in which said armature rotates at said lower rate and a closed position shorting out said resistance means in which said armature rotates at said higher rate.

6. A two speed electric motor comprising in combination an armature shaft, a plurality of armature windings supported on said armature shaft, means on said shaft providing a commutator having a plurality of segments each individually connected to a different one of said armature windings, a low speed centrifugal switch mounted on said armature shaft and connected circuit with said armature windings, said low speed switch operable in response to speeds of said armature above a predetermined lower rate of rotation to open and deenergize at least one of said armature windings, a high speed centrifugal switch mounted on said armature shaft and connected in circuit with said armature windings, said high speed switch being operable in response to speeds of said armature above a predetermined higher rate of rotation to open and deenergize at least one of said armature windings thereby to reduce the speed of armature rotation, direct voltage operating supply means connected with said commutator, first resistance means connected in series with said direct voltage operating supply means, second resistance means connected in parallel relation with said direct voltage operating supply means, and a speed selector switch connected in parallel with said first resistance means, said speed selector switch having an open position for applying a lower voltage to said commutator whereby said armature rotates at said lower rate and a closed position shorting out said first resistance for applying a greater voltage to said commutator whereby said armature rotates at said higher rate.

7. In a phonograph record player of the type having a turntable adapted to be rotated at any one of a plurality of speeds of rotation, a plural speed electric motor comprising in combination, an armature shaft having a plurality of armature windings mounted thereon, commutator means on said armature shaft having a plurality of conductive segments for connection with a direct current operating supply, means connecting one terminal of each of said armature windings with a different segment of said commutator means, means providing a first centrifugally operated switch having a pair of normally closed contacts and adapted to be actuated to open said contacts at a first speed of rotation of said armature, said first centrifugally operated switch being connected in series with one of said armature windings and operable upon application of a first direct voltage to said commutator means to open at speeds of rotation of said armature above said first speed of rotation thereby to deenergize the armature winding and reduce the speed, a second centrifugally operated switch having a pair of normally closed contacts which are adapted to be opened at a second higher speed of rotation of said armature shaft, said second centrifugally operated switch being connected in circuit with one of said armature windings and operable upon application of a second direct voltage of greater magnitude to said commutator means than said first direct voltage to open in response to speeds of rotation of said armature above said second speed of rotation thereby deenergizing said last-named winding and reduce the speed, and a driving means connecting said armature shaft with said turntable to drive said turntable at either of said speeds in response to changes in the magnitude of the direct voltage applied to said motor.

References Cited in the file of this patent

UNITED STATES PATENTS

| 2,176,804 | Roth et al. | Oct. 17, 1939 |
| 2,246,803 | Lee | June 24, 1941 |
| 2,552,286 | Russell | May 8, 1951 |

FOREIGN PATENTS

| 775,411 | Germany | Oct. 5, 1953 |